United States Patent [19]

Ovshinsky et al.

[11] Patent Number: 5,558,950
[45] Date of Patent: Sep. 24, 1996

[54] OPTIMIZED CELL PACK FOR LARGE SEALED NICKEL-METAL HYDRIDE BATTERIES

[75] Inventors: Stanford R. Ovshinsky, Bloomfield Hills; Michael A. Fetcenko, Rochester Hills; Arthur Holland, Bloomfield Hills; Kevin Dean; Donn Fillmore, both of Waterford, all of Mich.

[73] Assignee: Ovonic Battery Company, Inc., Troy, Mich.

[21] Appl. No.: 238,570

[22] Filed: May 5, 1994

Related U.S. Application Data

[63] Continuation-in-part of Ser. No. 26,901, Mar. 5, 1993, abandoned.

[51] Int. Cl.$^6$ ................................................. H01M 10/50
[52] U.S. Cl. ........................... 429/101; 429/120; 429/62
[58] Field of Search ................................. 429/120, 101, 429/163, 176, 62, 223; 420/900

[56] References Cited

U.S. PATENT DOCUMENTS

| | | | |
|---|---|---|---|
| 3,837,918 | 9/1974 | Nakabayashi | 429/104 |
| 4,383,013 | 5/1983 | Bindin et al. | 429/120 X |
| 4,517,263 | 5/1985 | Reiss et al. | 429/120 |
| 4,977,043 | 12/1990 | Kadouchi et al. | 429/101 X |

*Primary Examiner*—Anthony Skapars
*Attorney, Agent, or Firm*—Marc J. Luddy; Marvin S. Siskind; David W. Schumaker

[57] ABSTRACT

A sealed prismatic metal hydride battery greater than 10 Ah in size comprising a battery case of high thermal conductivity; and at least one bundle of metal hydride electrodes of high thermal conductivity in thermal contact with said battery case. Batteries according to the invention prevent the accumulation of heat that can damage nickel metal hydride batteries particularly during overcharge.

36 Claims, 7 Drawing Sheets

OPTIMIZED CELL PACK FOR LARGE SEALED NICKEL-METAL HYDRIDE BATTERIES

This application is a continuation-in-part of U.S. patent application Ser. No. 08/026,901, filed Mar. 5, 1993 abandoned.

FIELD OF THE INVENTION

The present invention relates generally to optimized cells for metal hydride batteries. More specifically, this invention relates to optimized cells that exhibit maximum heat dissipation with minimum weight. This invention also relates to an optimized case for large sealed batteries particularly when the optimized case is configured for maximum heat distribution and pressure containment for large sealed nickel metal hydride batteries for use in electric vehicles.

BACKGROUND OF THE INVENTION

Rechargeable prismatic batteries are used in a variety of industrial and commercial applications such as fork lifts, golf carts, and uninterruptable power supplies. Many electric vehicles presently in the planning stages use prismatic batteries.

Rechargeable lead-acid batteries are the most widely used type of battery. Lead-acid batteries are an excellent power source to drive a starter motor for an internal combustion engines. However, lead acid batteries have an energy density of only 30 Wh/kg and in an electric vehicle are capable of providing a vehicle range of only 30 to 120 miles before requiring a recharge. In addition, lead acid batteries require 6 to 12 hour to recharge, and contain large quantities of toxic materials. Further, electric vehicles using lead-acid batteries have sluggish acceleration, top speeds of only 50 to 60 mph, and a lifetime of 20,000 miles.

Nickel metal hydride batteries ("Ni—MH batteries") are far superior to lead acid batteries. Ni—MH prismatic batteries are also the most promising type of battery available for electric vehicles. For example, Ni—MH batteries, :such as those described in copending U.S. patent application Ser. No. 07/934,976 to Ovshinsky et al., now U.S. Pat. No. 5,277,999, the contents of which are incorporated by reference, have an energy density of 80 Nh/kg, can power a vehicle over 300 miles before requiring recharging, can be recharged in less than one hour, and contain no toxic materials. Prototype electric vehicles using Ni—MH batteries have an acceleration of 0–60 in 8 seconds, a top speed of 90 mph, and a projected lifetime of more than 100,000 miles.

Ni—MH batteries use a nickel hydroxide positive electrode and a hydrogen storage negative electrode. The electrodes are separated by a non-woven, felted, nylon or polypropylene separator. The electrolyte is usually an alkaline electrolyte, for example, containing 20 to 45 weight percent potassium hydroxide.

Ni—MH batteries were previously classified based on whether they used $AB_2$ or $AB_5$ alloys as the hydrogen storage material of the negative electrode. Both types of material are discussed in detail in copending U.S. patent application Ser. No. 07/934,976, referenced above. The distinction between $AB_2$ and $AB_5$ alloys have disappeared as the formulations of each type become based on multielemental substitution and disorder.

By forming metal hydride alloys from such disordered materials, Ovshinsky and his team were able to greatly increase the reversible hydrogen storage characteristics required for efficient and economical battery applications, and produce batteries capable of high density energy storage, efficient reversibility, high electrical efficiency, efficient bulk hydrogen storage without structural changes or poisoning, long cycle life, and repeated deep discharge. The improved characteristics of these alloys results from tailoring the local chemical order and hence the local structural order by the incorporation of selected modifier elements into a host matrix. Disordered metal hydride alloys have a substantially increased density of catalytically active sites and storage sites compared to single or multi-phase crystalline materials. These additional sites are responsible for improved efficiency of electrochemical charging/discharging and an increase in electrical energy storage capacity. The nature and number of storage sites can even be designed independently of the catalytically active sites. More specifically, these alloys are tailored to allow bulk storage of the dissociated hydrogen atoms at bonding strengths within the range of reversibility suitable for use in secondary battery applications.

Some extremely efficient electrochemical hydrogen storage materials were formulated, based on the disordered materials described above. These are the Ti—V—Zr—Ni type active materials such as disclosed in U.S. Pat. No. 4,551,400 ("the '400 Patent") to Sapru, Hong, Fetcenko, and Venkatesan, the disclosure of which is incorporated by reference. These materials reversibly form hydrides in order to store hydrogen. All the materials used in the '400 Patent utilize a generic Ti—V—Ni composition, where at least Ti, V, and Ni are present with at least one or more of Cr, Zr, and Al. The materials of the '400 Patent are multiphase materials, which may contain, but are not limited to, one or more $AB_2$ phases with $C_{14}$ and $C_{15}$ type crystal structures.

Other Ti—V—Zr—Ni alloys are also used for rechargeable hydrogen storage negative electrodes. One such family of materials are those described in U.S. Pat. No. 4,728,586 ("the '586 Patent") to Venkatesan, Reichman, and Fetcenko, the disclosure of which is incorporated by reference. The '586 Patent describes a specific sub-class of these Ti—V—Ni—Zr alloys comprising Ti, V, Zr, Ni, and a fifth component, Cr. The '586 Patent, mentions the possibility of additives and modifiers beyond the Ti, V, Zr, Ni, and Cr components of the alloys, and generally discusses specific additives and modifiers, the amounts and interactions of these modifiers, and the particular benefits that could be expected from them.

In contrast to the $AB_2$ alloys described above, the $AB_5$ alloys were generally considered "ordered" materials that had different chemistry, microstructure, and electrochemical characteristics compared to the $AB_2$ alloys. However, while this appears to have been true for the early $AB_5$ alloys, it is not true for the more recently developed ones.

The performance of the early ordered $AB_5$ materials was poor, but in the early 1980's, as the degree of modification increased (that is as the number and amount of elemental modifiers increased), their performance began to improve significantly. This is due as much to the disorder contributed by the modifiers as it is to their electrical and chemical properties. This evolution of $AB_5$ type alloys from a specific class of "ordered" materials to the current multicomponent, multiphase "disordered" alloys that are very similar to $AB_2$ alloys is shown in the following patents: (i) U.S. Pat. No. 3,874,928; (ii) U.S. Pat. No. 4,214,043; (iii) U.S. Pat. No. 4,107,395; (iv) U.S. Pat. No. 4,107,405; (v) U.S. Pat. No.

4,112,199; (vi) U.S. Pat. No. 4,125,688 (vii) U.S. Pat. No. 4,214,043; (viii) U.S. Pat. No. 4,216,274; (ix) U.S. Pat. No. 4,487,817; (x) U.S. Pat. No. 4,605,603; (xii) U.S. Pat. No. 4,696,873; and (xiii) U.S. Pat. No. 4,699,856. (These references are discussed extensively in U.S. Pat. No. 5,096,667 and this discussion is specifically incorporated by reference).

Simply stated, in the $AB_5$ alloys, like the $AB_2$ alloys, as the degree of modification increases, the role of the initially ordered base alloy is of minor importance compared to the properties and disorder attributable to the particular modifiers. In addition, analysis of the current multiple component $AB_5$ alloys indicates that current $AB_5$ alloy systems are modified following the guidelines established for $AB_2$ systems. Thus, highly modified $AB_5$ alloys are identical to $AB_2$ alloys in that both are disordered materials that are characterized by multiple components and multiple phases and there no longer exists any significant distinction between these two types of multicomponent, multiphase alloys.

In electric vehicles, weight of the batteries is a significant factor because the largest component of the total weight of the vehicle is the weight of the batteries. For this reason, reducing the weight of individual batteries is a significant consideration in designing batteries to power electric vehicles. One method to reduce weight for prismatic batteries for electric vehicles is to use plastic to replace metal components such as the case and parts of the electrodes.

Plastic cases are extensively used for lead acid batteries. Adapting this technology or other plastics technology to produce large, light cases for prismatic Ni—MH hydride electric vehicle batteries has not been difficult. Similarly, the use of pasted electrodes constructed by spreading alloy powder and a binder on a plastic screen or film as a means of reducing weight is also well known.

Heat generated during charging and discharging Ni—MH batteries is normally not a problem in small consumer batteries or even in larger batteries when they are used singly for a limited period of time. For example heat is rarely a problem with lead acid automobile batteries used to start internal combustion engines. But, large batteries that serve as a continual power source, particularly when more than one is used in series or in parallel, such as in a satellite or an electric vehicle, do generate sufficient heat on charging and discharging to affect the ultimate performance of the cell.

The prior art suggests a variety of solutions to excess heat: U.S. Pat. No. 3,830,663, to Eisele, et al., describes a battery holder for providing a thermal path from the battery to the skin of a satellite. The holder involves top and bottom plates of anodized material that are in contact with the top and bottom of the battery and painted black to radiate absorbed heat to the skin of the satellite. This patent contains no teaching at all regarding heat transfer from the interior of the battery to the battery case.

U.S. Pat. No. 4,115,630 to Van Ommering, et al., describes a metal oxide-hydrogen battery having bipolar electrodes arranged in a centrally drilled stack. This patent describes conducting heat generated in the electrode stack via the hydrogen gas of the cell. In particular, this patent specifically states that heat conduction perpendicular to electrode plates is 10–20 times smaller than conduction parallel to electrode plates, so that cells using flat electrodes must be modified significantly which adds unacceptably weight. Thus, this patent teaches away from cells using flat plate electrodes.

J. Lee, et al. describe resistive heating and entropy heating in lead-acid and nickel/iron battery modules in 133(7) JESOAN 1286 (July, 1986). This article states that the temperature of these batteries is due to resistive heating and entropy changes of the electrochemical reactions often varies considerably during their operation. This article notes that the thermal resistance caused by the cell case plays an important role as the cell temperature increases. While this reference suggests that an additional "cooling structure" should be added to the battery, no suggestion is made as to the specifics of such a structure. Further, there is no teaching or suggestion that the interior components of the battery might play any role in thermal management.

U.S. Pat. No. 4,865,928 to Richter describes a method of removing heat from the interior of a high-performance lead acid battery by attaching a U-shaped tube to the negative electrode grid and circulating a coolant through the tube. This patent contains no teaching or suggestion that the interior components of the battery might play any role in thermal management.

U.S. Pat. No. 5,035,964 to Levinson et al. describes a finned heat sink connected to a battery by a copper or aluminum bar, where the finned heat sink produces a convective flow of air in a chimney to cool the battery. This patent contains no teaching or suggestion that the interior components of the battery might play any role in thermal management.

The solutions suggested in these references all involve the addition of some kind of apparatus to hasten the dissipation of excess heat. The addition of apparatus results in added weight and cost as well as reduced efficiency. Because battery weight is one of the greatest problems confronting EV manufacturers, anything that increases weight does not constitute a solution to the problem. In addition, as noted above, none of these references contain any teaching or suggestion that the interior components of the battery could play a role in thermal management of the cell.

While the use of plastic may overcome the weight problem, plastic is an inefficient conductor of heat. In addition, in sealed cells, the ability of the case to withstand high internal pressure is important. This is particularly true in NI-MH cells, where the cells normally must be capable of containing gas generated on overcharge and overdischarge without venting, or deformation of the cell case.

The operation of a nickel metal hydride cell produces gas during overcharge and overdischarge. As a result, the internal cell pressures may vary substantially during operation. Because of this, hydrogen storage cells are typically produced as either sealed cells or vented cells. During normal operation, a sealed cell does not permit the venting of gas to the atmosphere. In contrast, a vented cell will release excess pressure by venting gas as part of its normal operation. As a result of this difference, the vent assemblies used in sealed and vented cells are quite different from one another, and the amounts of electrolyte in the cell container relative to the electrode geometry differ significantly.

Sealed cells are manufactured predominantly in cylindrical and rectangular configurations. Sealed cells are usually designed to operate in a starved electrolyte configuration. The cell enclosure for a sealed cell is normally metallic and designed for operation at pressures up to about 100 pounds per square inch absolute or even higher. Sealed cells are characterized by the substantial absence of any required maintenance.

As discussed above, the operation of a NiMH cell produces gases depending on the amount of electrolyte, the operating temperature, as well as variations in components, chemical concentrations, and manufacturing techniques.

The production of these gases frequently result in deformation of the cell can. It is, of course, desirable that such deformation be avoided in large cell packs.

BRIEF SUMMARY OF THE INVENTION

An object of the present invention is a cell configuration for prismatic metal hydride batteries that will prevent damage to such batteries by heat generated during their operation without an unacceptable increase in the weight of the cell, as well as an improved cell module configuration that will permit dissipation of heat and sufficient pressure containment.

These objects can be achieved by the following aspects of the present invention:

A sealed prismatic metal hydride battery greater than 10 Ah in size comprising: a battery case of high thermal conductivity; and at least one bundle of metal hydride electrodes of high thermal conductivity in thermal contact with the battery case.

A sealed prismatic metal hydride battery module comprising: a plurality of metal hydride cells each comprising a case of high thermal conductivity enclosing at least one bundle of metal hydride electrodes of high thermal conductivity in thermal contact with the case; and a module case of high thermal conductivity enclosing the plurality of metal hydride cells and in thermal contact with at least one case of the plurality of metal hydride cells.

A high surface area case for heat dissipation and pressure containment for a sealed prismatic metal hydride battery module comprising: a plurality of cells; a top frame positioned around the periphery of the plurality of cells; a bottom frame positioned opposite the top frame and around the opposite periphery of the plurality of cells; a first finned plate positioned perpendicular to the top frame and the bottom frame and connecting the top and bottom frames; a second finned plate positioned perpendicular to the top frame and the bottom frame, connecting the top and bottom frames, and opposing the first finned plate; and at least two opposing restraining means perpendicular to and connecting the first and the second finned plate.

A high surface area case for heat dissipation and pressure containment for a cell module comprising: a plurality of cells; a plurality of thermal conduction plates positioned to prevent adjacent cells of the plurality of cells from contacting each other; opposing end panels positioned parallel to the plurality of thermal conduction plates at the outermost cells of the plurality of cells; and restraining means positioned around the plurality of cells, the plurality of thermal conduction plates, and the opposing end panels to form a pressure containment system.

A high surface area prismatic battery module for heat dissipation and pressure containment comprising: a plurality of prismatic metal hydride cells in individual cases, each cell comprising high thermal conductivity electrodes in a high thermal conductivity case; opposing end panels positioned parallel to the longitudinal axis of the plurality of cells; and restraining means positioned on the widest axis of the plurality of cells to prevent deformation of the cases, where the restraining means and the opposing end panels form a pressure containment system.

BRIEF DESCRIPTION OF THE DRAWINGS

FIG. 4 and FIG. 5 are side views of a cell module of the present invention showing longitudinal cross sections of the same embodiment shown in FIG. 3. FIGS. 4 and 5 show different side views of the restraining means that interlock with the finned end panels and thus form a pressure containment system.

DETAILED DESCRIPTION OF THE INVENTION

In all batteries, heating occurs during charging and discharging. Because internal resistance in Ni—MH batteries is low, less heat is generated than in many prior art types of batteries. Recent experimental data indicates that during overcharge the heat generated by the recombination of oxygen, while not significant in small consumer batteries, can become a problem in large sealed prismatic Ni—MH batteries and modules configured, for example, for an electric vehicle.

Heat becomes a particular problem in sealed Ni—MH prismatic cells having pasted positive and pasted negative electrodes and a plastic case. Recent analysis of such cells found that the heat generated during overcharge is essentially trapped in the cell where temperatures can reach 80° C. In Ni—MH batteries, excessive heat significantly decreases the cells' capacity, self-discharge, and charge acceptance. In addition, the cells' life was decreased due to separator and seal degradation as well as accelerated degradation of the nickel hydroxide and metal hydride active materials.

Ni—MH batteries for consumer applications using disordered $AB_5$ type alloys have traditionally used pasted metal hydride electrodes in order to achieve sufficient gas recombination rates and to protect the base alloy from oxidation and corrosion. The pasted electrode typically mixes the active material powder with plastic binders and other non-conductive hydrophobic materials to the electrode. An unintended consequence of this process is a significant reduction in the thermal conductivity of the electrode structure as compared to a structure of the present invention which consists essentially of a 100% conductive active material pressed onto a conductive substrate.

In a sealed prismatic Ni—MH battery according to the present invention, the buildup of heat generated during overcharge is avoided by using a cell bundle of thermally conductive Ni—MH electrode material. This thermally conductive Ni—MH electrode material contains Ni—MH particles in intimate contact with each other. Oxygen gas generated during overcharge recombines to form water and heat at the surface of these particles. In the present invention, this heat follows the negative electrode material to the current collector and then to the surface of the case. The thermal efficiency of the bundle of thermally conductive Ni—MH electrode material can be further improved if this electrode bundle is in thermal contact with a battery case that is also of high thermal conductivity.

In the present invention, the Ni—MH negative electrode material is preferably a sintered electrode such as described in U.S. Pat. Nos. 4,765,598; 4,820,481; and 4,915,898 (the contents of which are incorporated by reference) sintered so that the Ni—MH particles are in intimate contact with each other.

The positive electrode materials used in the present invention are nickel hydroxide positive electrode materials. The positive electrode materials may be sintered positive electrode materials of the type described in U.S. patent application Ser. No. 07/975,031, filed Nov. 12, 1992, now U.S. Pat. No. 5,344,728, as well as positive electrode materials pasted on nickel foam.

One aspect of the present invention recognizes that in sealed NiMH batteries, heat generation is particularly high during overcharge, especially under commercially desirable fast charge applications. It is noteworthy that the heat generated during overcharge is due to oxygen recombination on the surface of the metal hydride electrode. Consequently, it is possible to utilize a high thermal conductivity metal hydride electrode in conjunction with a lower thermal conductivity pasted positive electrode. This preferred embodiment is especially useful for optimizing specific energy, overall performance, and cost of the battery.

The battery case of the present invention is preferably constructed of a metallic material such as stainless steel or aluminum. If necessary, the metallic material can be stamped, embossed, or shaped to form pressure containing surfaces that counter the internal pressure of the sealed battery and thus prevent bulging of the case. Bulging is detrimental to individual batteries because it alters the electrolyte distribution and spatial orientation of the electrodes and separators.

Figure 1:
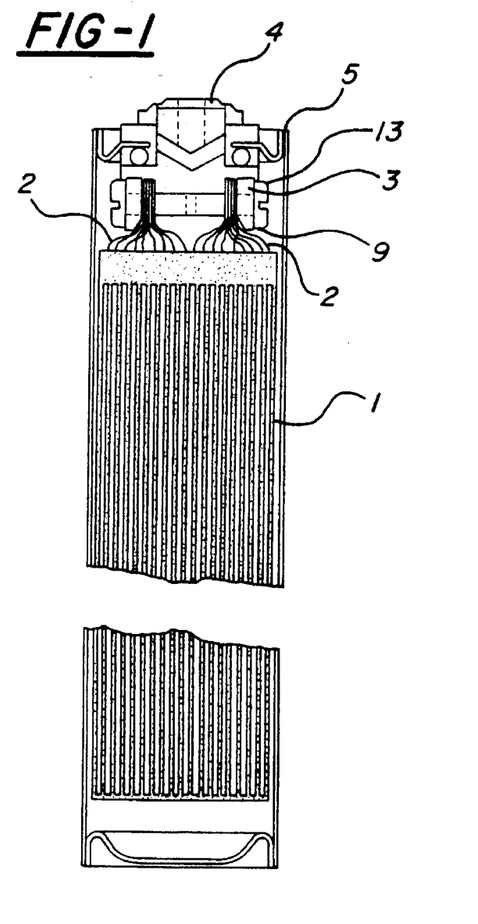
FIG. 1 shows side view of a bundle of high thermal conductivity Ni—MH electrodes in thermal contact with a single wall prismatic battery case

FIG. 1 shows a side view of a bundle of high thermal conductivity nickel/metal hydride electrodes in thermal contact with a single wall prismatic battery case. Individual thermally conductive nickel hydroxide positive and metal hydride negative electrodes 1 are connected via electrode tabs 2 to tab connectors 3 which are in thermal and electrical contact with electrode terminals 4, and the battery case 5. The tab connectors 3 are shown as being gathered together and physically bolted to their respective battery terminals. As discussed in U.S. patent application Ser. No. 08/140,933 now U.S. Pat. No. 5,472,802 (the contents of which are incorporated by reference), the space required for bolting necessitates a minimum required overhead space (head space) between the tops of the battery electrode plates and the top of the battery case and it is preferable to use tab collection combs.

Figure 2:
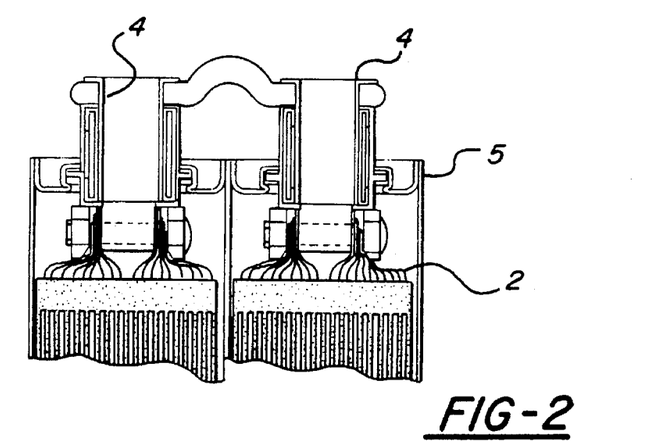
FIG. 2 shows in greater detail how the tabs from each electrode plate are gathered to make electrical and thermal contact with the terminals and how the terminals make thermal contact with the case.

FIG. 2 shows in greater detail how the electrode tabs 2 from each electrode 1 are connected to make electrical and thermal contact with the terminals 4 and how the terminals 4 are connected to the battery case 5. The terminals 4 are shown as hollow annular barrel connectors of the type described in U.S patent application Ser. No. 08/140,933 (the contents of which are incorporated by reference). Such barrel connectors friction fit into the axially aligned central opening of battery terminals 4.

Figure 3:
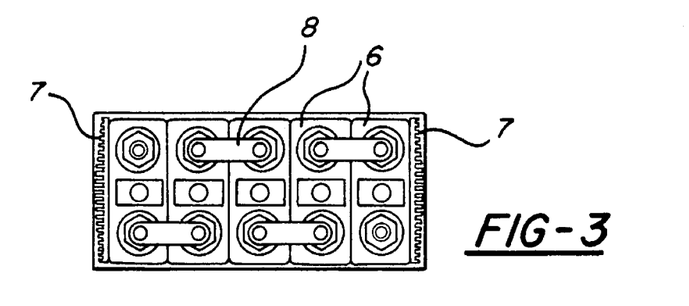
FIG. 3 is a top view of a cell module of the present invention showing a plurality of high thermal conductivity prismatic metal hydride cells in individual cases joined together in a module. The opposing end panels have spacedly disposed fins of incrementally increasing size toward the mid line such that the apex of these fins forms a convex surface.

FIG. 3 is a top view of a cell module of the present invention showing a plurality of high thermal conductivity prismatic metal hydride cells 6 in individual cases joined together in a module. The opposing end panels 7 are shown with spacedly disposed fins that increase in size toward the mid line such that the apex of these fins forms a convex surface. The opposing end panels, as well as other parts of the individual batteries and modules, may be coated with a dielectric that maintains their excellent thermal conductivity while making them electrically insulating. The terminal connectors 8 are constructed out of a thermally and electrically conductive material such as a solid bar; a metal ribbon; a single or multi strand wire; or a braided, high current, battery cable. The terminal connectors provide additional surface area to transfer heat away from the cell case.

Figure 4:
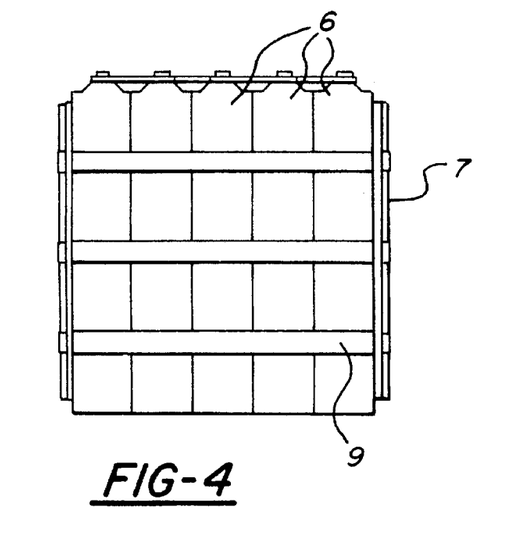
Figure 5:
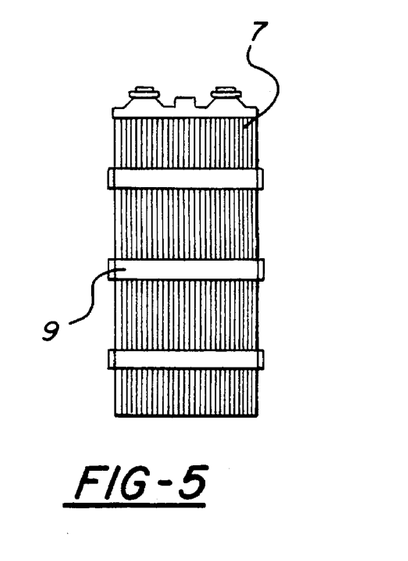

FIG. 4 and FIG. 5 are side views of a cell module of the present invention showing longitudinal cross sections of the same embodiment shown in FIG. 3. FIGS. 4 and 5 show different side views of the restraining means 9 that interlock with the finned end panels 7 to form a pressure containment system.

Figure 6:
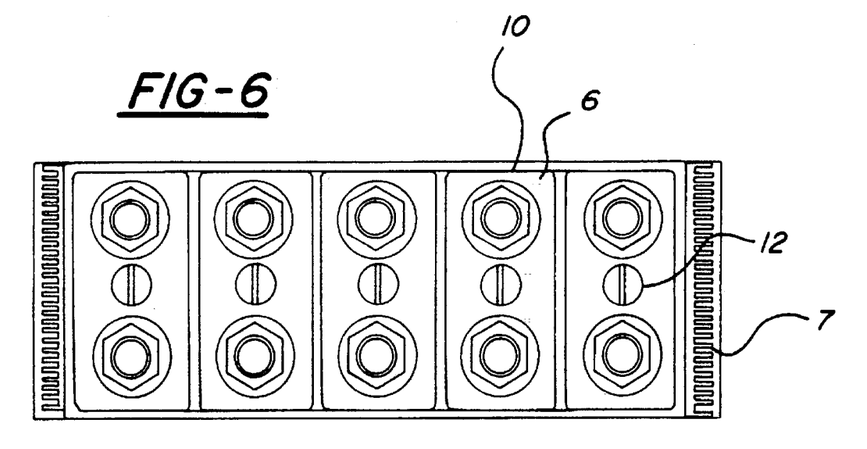
FIG. 6 is a top view of a cell module employing a finned plate and top and bottom frames to form a pressure containment system.

FIG. 6 is a top view of a cell module employing a finned end panel 7 and top frame 10 and bottom frame 11 to form a pressure containment system. The top frame 10 extends around the periphery of the cells 6 in the illustrated module leaving free access to the electrode terminals 4 and may also contain, for example, a resealable pressure vent 12 (or a rupture disk). This pressure vent is preferable of the type described in U.S. Pat. No. 5,258,242, the contents of which are incorporated by reference. Alternatively, the top frame 10 could be solid and contain the electrode terminals and a vent. The finned plates 7, oppose each other and are coupled together with a restraining means 13 to form a pressure containment system. Alternatively, all four sides of the improved case according to the present invention may be finned surfaces.

Figure 7:
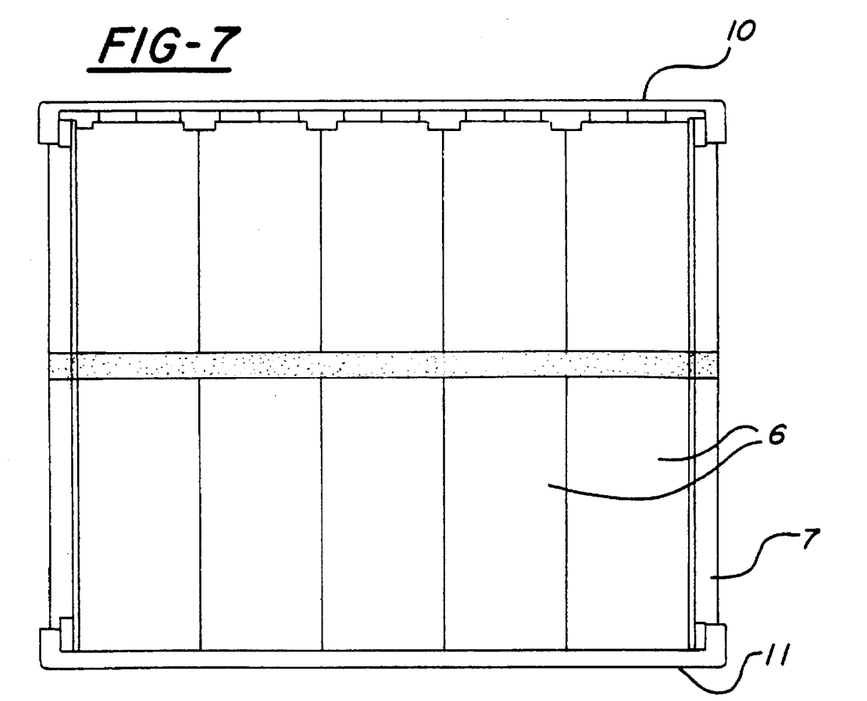
FIG. 7 is cross sectional view of FIG. 6

FIG. 7 is cross sectional view of FIG. 6. FIG. 7 shows a side view of a cell module embodiment of the present invention. A restraining means 13, can be configured as a central band, if desired, to increase pressure retention. The restraining means 13 can also be configured to radiate heat to increase heat distribution. The finned plates 7 are shown in longitudinal cross section extending from the top frame 1 to the bottom frame 7. The finned plates 7, oppose each other and are coupled together with a restraining means 13 to form a pressure containment system. Alternatively, all four sides of the improved case according to the present invention may be finned surfaces.

Figure 8:
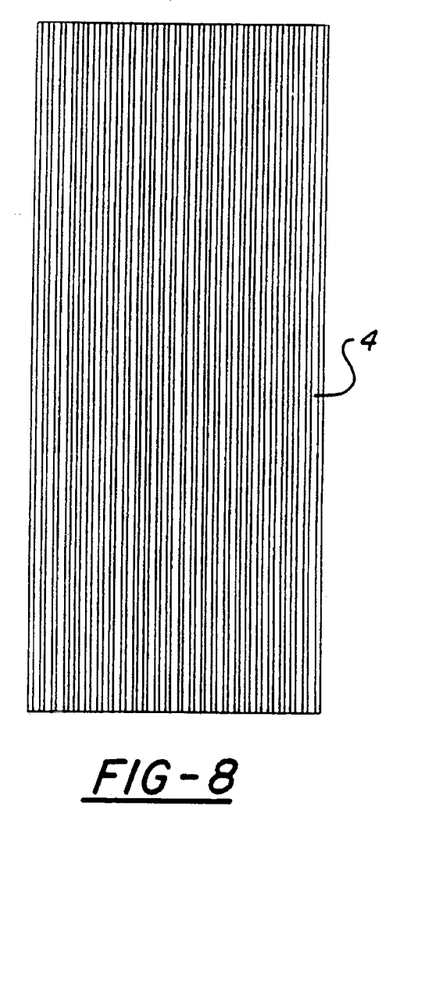
FIG. 8 is a face view of a finned plate.

FIG. 8 is a face view of a finned plate 7. The fins on the plate may be of uniform size (as shown in FIG. 6) or may increase in size incrementally toward the mid line of the finned plate so the apex of the fins forms a convex surface (as shown in FIG. 9).

Figure 9:
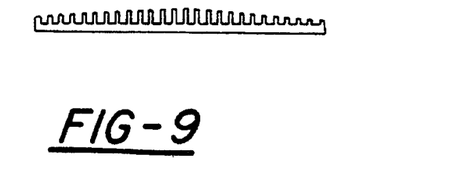
FIG. 9 is cross sectional view of a finned plate showing how the fins of the plate increase in size toward the mid line such that the apex of the fins forms a convex surface.

FIG. 9 is cross sectional view of a finned plate showing how the fins of the plate increase in size toward the mid line so that the apex of the fins forms a convex surface.

Figure 10:
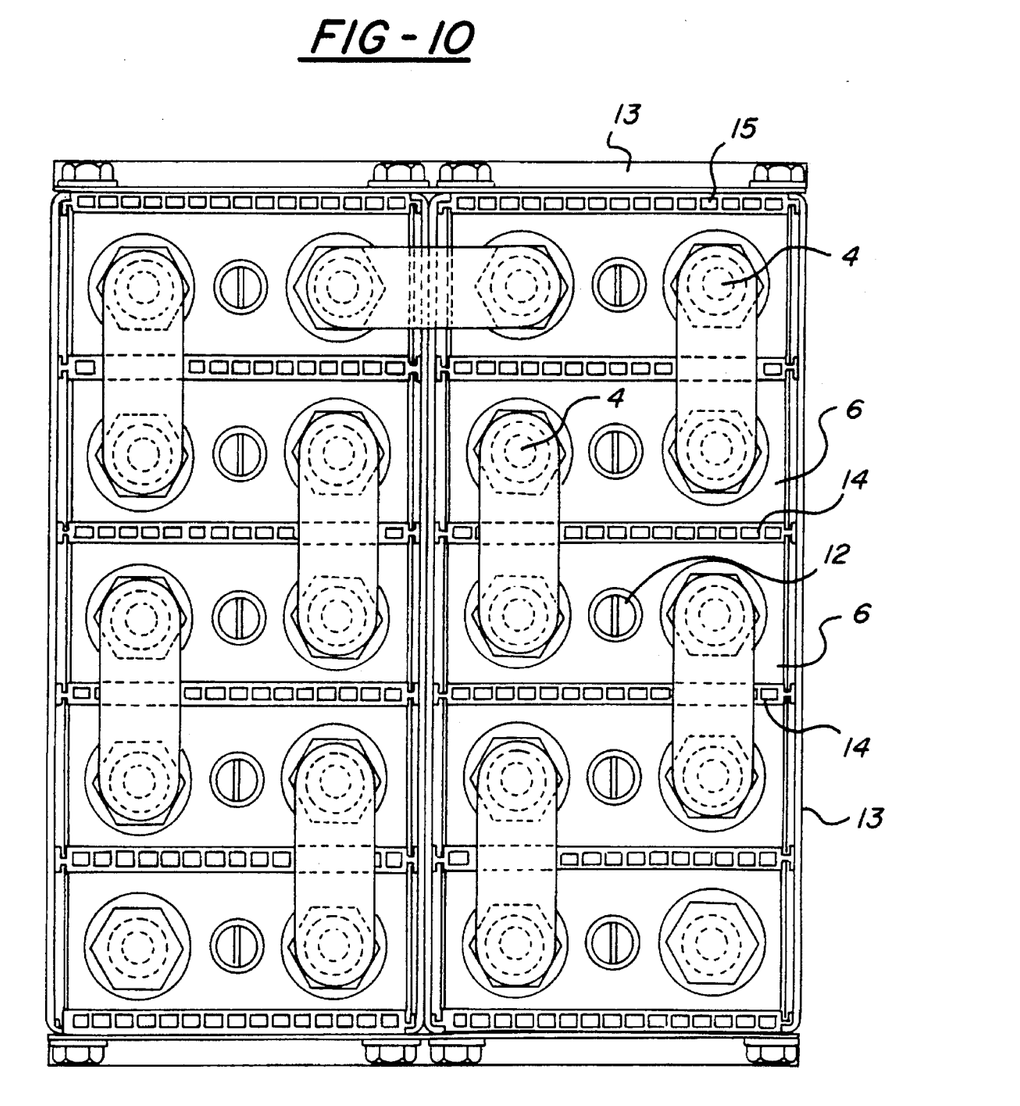
FIG. 10 is a top view of an embodiment of the present invention showing a plurality of thermal conduction plates made of honeycombed material positioned to prevent adjacent cells from contacting each other.

FIG. 10 is a top view of an embodiment of the present invention showing a plurality of thermal conduction plates 14 made of honeycombed material positioned to prevent adjacent cells 6 from contacting each other. Also shown is a top view of the electrode terminals 4; the pressure vent 12; the opposing end panels 15; and restraining means 13. The end panels 15 are shown in FIG. 10 as identical to the thermal conduction plates 14. However, the end panels may also be configured in a variety of ways to increase their thermal conduction, and/or pressure retention properties. While shown as straps, it is intended that the restraining means 13 can be configured in the most efficacious way possible. For example, the restraining means could be a rigid strap, a tubular bar, or a plate. In addition, the restraining means 6 could be constructed to have high thermal conduction and radiation properties (i.e., it could be finned, as could the end panels as shown in FIGS. 3, 8, and 9).

Figure 11:
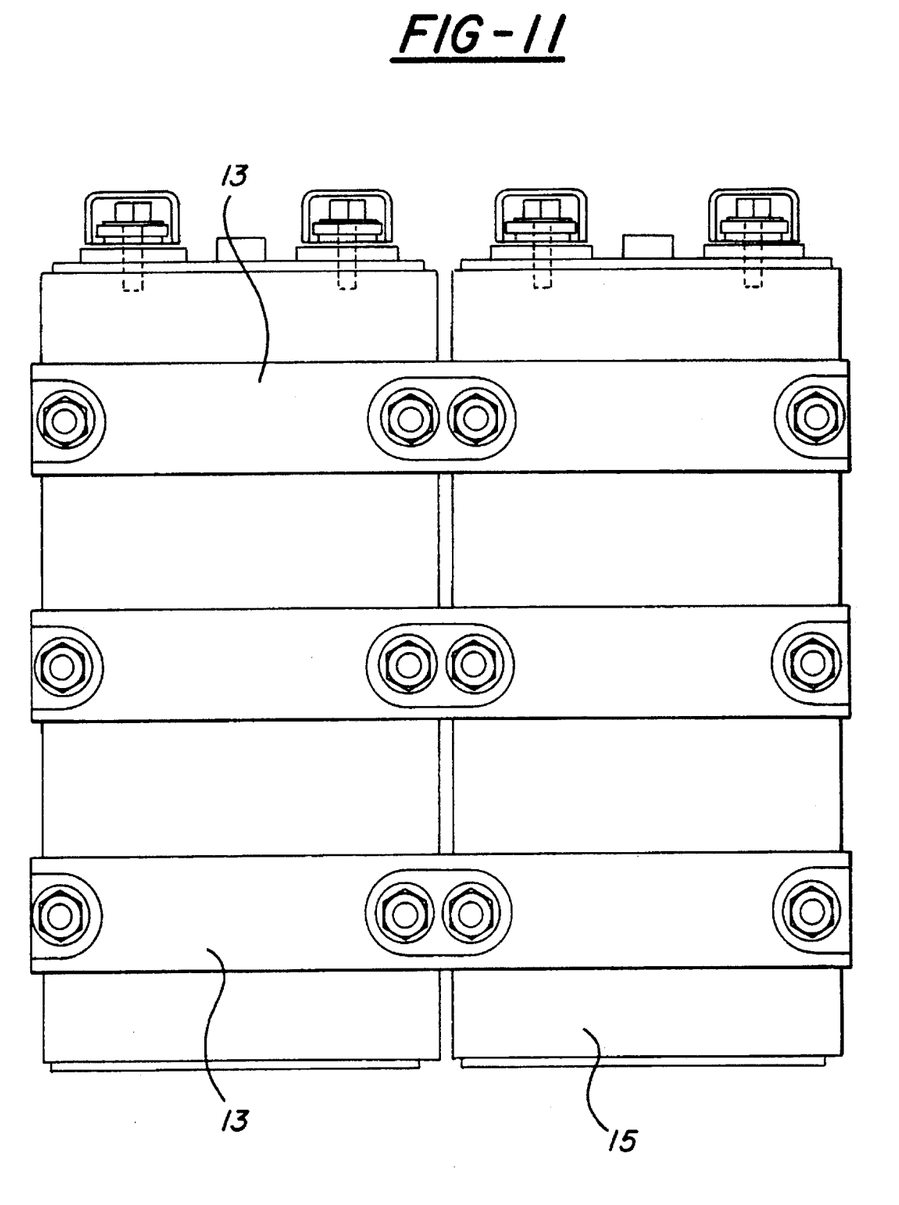
FIG. 11 is a side view of the embodiment of FIG. 10 showing one of the opposing end panels. In this embodiment, the restraining means is bolted on to the honeycombed material that forms the end panels.

FIG. 11 is a side view of the embodiment of FIG. 10 showing one of the opposing end panels. In this embodiment, the restraining means 13 is bolted on to the end panels 15.

Figure 12:
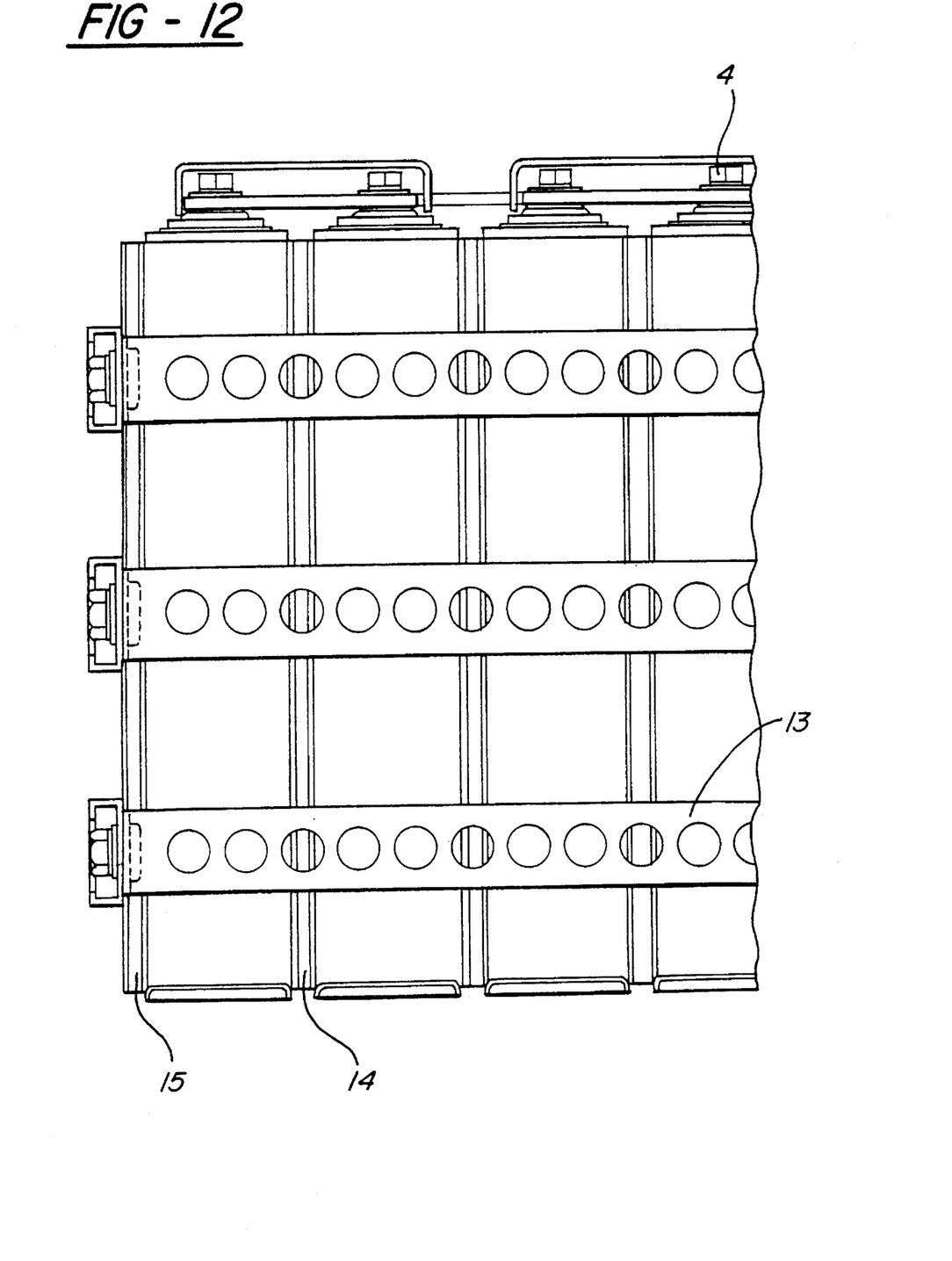
FIG. 12 is a side view of the embodiment of FIG. 10 showing cross sectional views of several thermal conduction plates and one of the opposing end panels.

FIG. 12 is a side view of the embodiment of FIG. 10 showing cross sectional views of several thermal conduction plates 14, one of the opposing end panels 15, and the electrode terminals 2. In this figure, the restraining means 13 are shown as straps perforated for weight reduction.

Figure 13:
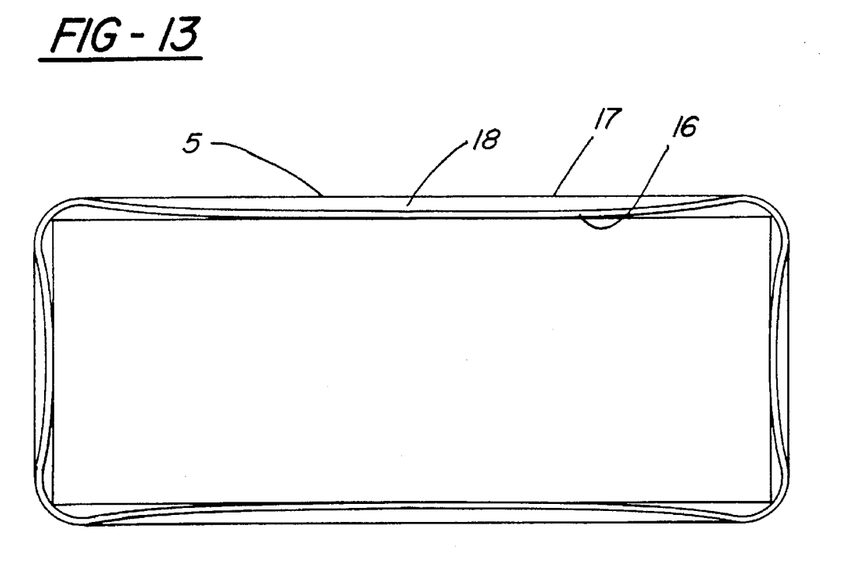
FIG. 13 shows an embodiment of a battery case according to the present invention having an inner wall and an outer wall, where the inner wall is bowed toward the interior of the battery case and tensioned against the outer wall.

Another embodiment of the present invention is illustrated in FIG. 13. The battery case 5 consists of an inner wall 16 and an outer wall 17. The inner wall 16 bowed inward at the centers and tensioned against the outer wall 17. As the bowed inner wall flexes in response to pressure changes within the battery, the force of this pressure builds up, and the outer wall is stretched longitudinally. The principal of the case is a tensioned arc positioned so that the force that usually causes bulging of the case is directed toward its corners thus keeping the sides of the case flat. The redirection of force using a tensioned arc is hardly new. For example, a tensioned arc is what keeps a bicycle wheel from collapsing. What is new is the use of the arc in the claimed sealed prismatic battery. Preferably, the tension on the bowed inner wall is sufficient to accept a 10% deflection of the electrode plates. Additional cooling of the battery case 1 can be provided by placing a coolant in the gap 18. This coolant can be an active or passive flow of air, cooling gas, or liquid. Optionally, the gap 18 can also contain a heat sink material such as metal foil. The incorporation of coolant or heat sink material is easily visualized by one of skill in the art.

Figure 14:
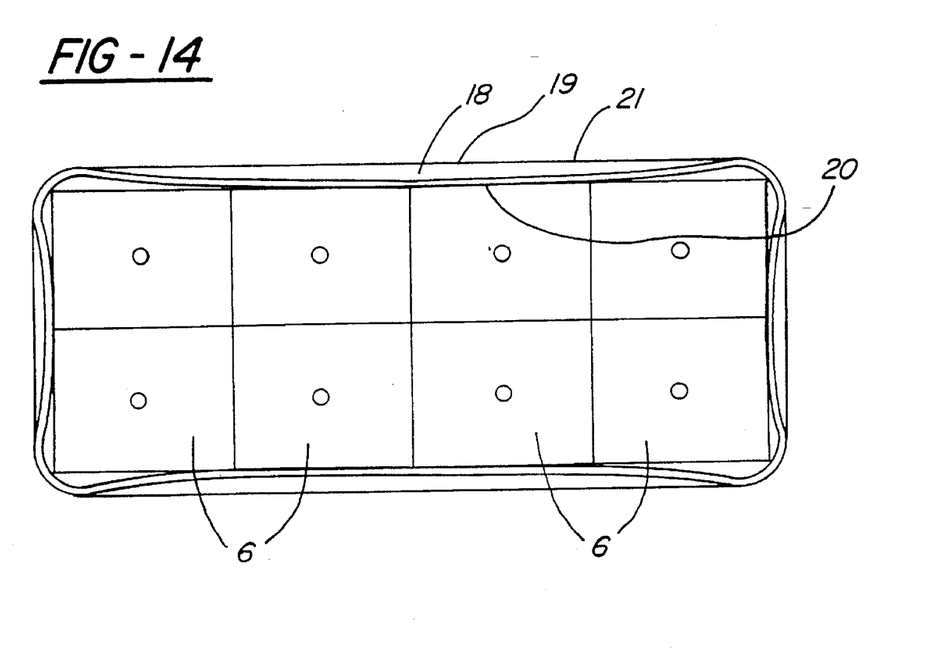
FIG. 14 illustrates a battery module case where the inner wall is bowed toward the interior of the battery case and tensioned against the outer wall.

FIG. 14 illustrates a battery module case 19 where the inner wall 20 is bowed toward the interior of the battery case and tensioned against the outer wall 21. In this embodiment, a plurality of cells 6 are grouped together in to form the module 19. Also as described above, the gap 18 between the inner wall and outer wall of the module case can be filled with a coolant or heat sink material.

EXAMPLES

Preparation of Negative Electrode Materials

Alloy materials having the formula $$V_{18}Ti_{15}Zr_{18}Ni_{29}Cr_5Co_7Mn_8$$

were prepared by weighing and mixing starting materials of the component elements into a graphite crucible as described in U.S. Pat. Nos. 5,002,730 and 4,948,423. The crucible and its contents were placed in a vacuum furnace that was evacuated and then pressurized with approximately one atmosphere of argon. The crucible contents were melted by high frequency induction heating while under the argon atmosphere. The melting was carried out at a temperature of about 1500° C. until a uniform melt was obtained. At that time, the heating was terminated and the melt was allowed to solidify under an inert atmosphere blanket. The ingot of alloy material was then reduced in size in a multi-step process. The first step involved a hydriding/dehydriding process substantially as described in U.S. Pat. No. 4,983,756 the disclosure of which is specifically incorporated by reference.

In this first step, the alloy was reduced in size to less than 100 mesh. Subsequently, the material obtained from the hydriding/dehydriding process was further reduced in size by an impact milling process in which the particles were tangentially and radially accelerated against an impact block. This process is described in U.S. Pat. No. 4,915,898 the disclosure of which is specifically incorporated by reference. A fraction of the alloy material having a particle size of less than 200 mesh and a mass average particle size of about 400 mesh (38 microns) was recovered from the impact milling process and bonded to a nickel screen current collector by a process which involves disposing a layer of alloy material onto the current collector and compacting the powder and collector. Compacting was carried out under an inert atmosphere with two separate compaction steps, each at a pressure of about 16 tons per square inch. After compaction, the current collector and the powder adhered to it were sintered in an atmosphere of about 2 atomic percent hydrogen with the balance argon to form negative electrode materials.

The 0.036 cm thick sintered negative electrode materials were cut into 7.5 cm×13.3 cm pieces and tab connections welded at the corners.

Comparison negative electrode materials were prepared as describe above, except misch metal alloys were used.

Preparation of Positive Electrode Materials

Nickel hydroxide positive electrode materials as used in the invention were prepared as described in U.S. patent application Ser. No. 07/975,031, filed Nov. 12, 1992, now U.S. Pat. No. 5,344,728. A slurry was prepared using nickel powder, water, carboxy methyl cellulose binder, methyl cellulose binder, and POLYOX® poly(ethylene oxide) polymer in the quantities indicated in Table 1.

All the materials except water were added to a mixing drum which was rotated for thirty minutes at 2 rpm. Water was then added and mixed in with a stirring rod to remove air and reduce lumps to less than 0.5 inches in diameter. The drum was again sealed and mixed at 2 rpm. After 48 hours, the density of the resulting slurry was checked and any visible lumps broken. Viscosity was adjusted to 72,000

Centipoise (cp) (+/−4,000 cp) and density to 1.68 g/cc (+/−0.03 g/cc).

Sintering took place in a five zone furnace with each zone set at approximately 910° C. Prior to sintering, the slurry was doctor bladed onto a preoxidized perforated solid nickel substrate and dried in a two zone drying tower at temperatures of 107° C. and 88° C. The air flow was maintained at 5 SCFM. Drying took place under a 7% hydrogen, 93% nitrogen atmosphere. The physical parameters of these materials at this point are shown in Table 1.

TABLE 1

|  | after drying tower | after sintering | after doctor blading |
|---|---|---|---|
| thickness (in) | 0.094 | 0.045 | 0.036 |
| area weight (g/in$^2$) | 2.21 | 1.241 | 1.18 |
| Density (g/in$^3$) | 23.5 | 27.6 | 32.6 |

Sintered material was then coiled on impregnation racks. The impregnation process involved 14 individual impregnation cycles. Each impregnation cycle involved a nitrate dip in nickel or cobalt nitrate, drying, a alkaline dip in NaOH, rinsing, and drying. The nitrate dip of impregnation cycle 1 was in 0.02N $HO_3$ in 2.5M $Ni(NO_3)_2$ hexahydrate for 20 minutes. The nitrate dips for impregnation cycles 6 and 14 were in cobalt nitrate hexahydrate for 20 minutes. The nitrate dips for all other impregnation cycles used 0.4N $HO_3$ in 2.5M $NiNO_3)_2$ hexahydrate for 15 minutes.

For each impregnation cycle, following the nitrate dip in the appropriate nitrate solution, the impregnation rack was lifted out of the solution and allowed to drip dry for 30 minutes. The rack was then placed in a forced air recirculation dryer at 80° C. for 60 minutes where the dryer had a flow rate of 2,000 ft$^2$/minute.

Rinsing following the nitrate dip, was done in a three tank system having a counter current flow from tank 3 to 2 to 1. Tank 1 was a spray rinse and tanks 2 and 3 were immersion rinses. Deionized water was used throughout.

Following the final impregnation cycle, impregnated positive material was uncoiled from the impregnation racks and coiled onto formation spools. The material was then fed continuously at a rate of 8"/minute into the formation machine. In the formation machine the formation spools were placed in a presoak tank containing 30% NaOH electrolyte at 45° C. The material was then fed from the formation spools through opposing nylon brushes (to remove surface loading and loose particulates), and into a charge section.

The charge section consisted of four tanks containing counter electrodes and contact rollers. In the charge section, the contact rollers were connected to the positive terminal of a power supply while counter electrodes were connected to the negative terminal. This section provided the electrode material with at least 90% of its theoretical state of charge in order to encourage electrolyte absorption and cell capacity, as well as to remove electrochemically inactive charge reserve. Electrolyte in the charge section was maintained at a temperature of 45° C. to assist the charging reaction efficiency. Also, the electrolyte was recirculated and sprayed onto the contact rollers and tension on the belt of the material was kept high in order to provide optimal conductivity between the rollers and the material.

The material was passed into a discharge section consisting of two tanks were it received approximately a 6% overdischarge, on an average, in order to insure that all material was fully discharged.

The material was rinsed using deionized water and nylon brushes. Finally, the material was dried using an infrared heater. The resulting positive electrode belt was 0.096 cm thick. This belt was slit, punched, cut to 7.5 cm×14 cm pieces, and fabricated into standard positive electrodes with welded tabs.

Comparison positive electrode materials were prepared from commercially available nickel hydroxide material that was mixed with water and polyvinyl alcohol to form a slurry. This slurry was pasted on nickel foam substrate.

Preparation of Large Prismatic Cells

Negative and positive electrode materials according to the invention were placed in double grafted polypropylene bags from Freudenberg. Packs of 17 positive electrodes and 18 negative electrodes were prepared. These packs were placed in rectangular, single wall, rolled steel, prismatic battery cases measuring 18 cm×8.2 cm×3.4 cm and assembled into cells having a resealable vent, using a 30% KOH electrolyte. The tops and bottoms of these cases were crimped closed as described in U.S patent application Ser. No. 08/140,933, the contents of which are incorporated by reference. A total of five such cells were constructed.

The comparison electrode materials were placed in double grafted polypropylene separator bags. Packs of 17 comparison positive electrodes and 18 comparison negative electrodes were prepared. These packs were placed in PVC cases 18 cm×8.2 cm×3.4 cm and assembled into cells having a resealable vent, using a 30% KOH electrolyte. The tops and bottoms of these cases were also PVC. The comparison cases were closed using laser welding. A total of five such cells were constructed.

EXAMPLE 1

The cells embodying the present invention and the comparison cells were tested. Averaged results of these tests are presented in Table 2:

TABLE 2

|  | Comparison Cell | Present Invention |
|---|---|---|
| capacity | 200 Ah | 200 Ah |
| energy density | ≈70 Wh/kg | ≈80 Wh/kg |
| negative electrode construction | pasted | sintered, compacted |
| negative alloy composition | misch metal | $V_{18}Ti_{15}Zr_{18}Ni_{29}Cr_5Co_7Mn_8$ |
| positive electrode | Ni(OH)$_2$ pasted onto foam substrate | Ni(OH)$_2$ chemically impregnated on sintered Ni substrate |
| case | plastic | stainless steel |
| top | plastic | stainless steel |
| temperature after cycling(charge/discharge cycling at C/10 overcharge to 120% of capacity | 80° C. | 34° C. |

EXAMPLE 2

Five cells embodying the present invention prepared as described above were assembled into a 6 volt, 80 Ah pack. This pack was quick charged at 190 Amps (4C) for 15 minutes to 60% charge input. The pack temperature after charging was 50° C. A single plastic cased cell in Example 1 that was slow charged at C/10 reached a temperature of 80° C. compared to the 50° C. of the pack according to the invention. It's easy to conclude that a five cell pack of plastic case cells, if quick charged at a 4C rate would reach temperatures well above the 80° C. of a single cell.

It is obvious to those skilled in the art that additional combinations of the unique features described above can be made without departing from spirit and scope of the present invention. For example, extensive addition of conductive components such as metallic nickel or copper powder to a pasted electrode is anticipated. The discussion and description of this specification are merely illustrative of particular embodiments of the invention and are not meant to limit the invention, It is the following claims, including all equivalents, that define the scope of the invention.

We claim:

1. A sealed prismatic metal hydride battery greater than 10 Ah in size comprising:
   a battery case of metallic thermally conductive material;
   nickel hydroxide positive electrodes, and
   at least one bundle of thermally conductive sintered metal hydride electrodes in thermal contact with said battery case.

2. The sealed prismatic metal hydride battery claimed in claim 1, wherein said at least one bundle comprises compacted sintered nickel metal hydride particles in intimate contact with each other.

3. The sealed prismatic metal hydride battery claimed in claim 1, wherein said battery case is configured to form pressure containing surfaces.

4. The sealed prismatic metal hydride battery claimed in claim 1, wherein said battery case comprises an inner wall and an outer wall, where said inner wall is bowed toward the interior of said battery case and tensioned against said outer wall.

5. The sealed prismatic metal hydride battery claimed in claim 4, wherein said inner wall and said outer wall are positioned to define a gap.

6. The sealed prismatic metal hydride battery claimed in claim 5, further comprising a coolant in said gap.

7. The sealed prismatic metal hydride battery claimed in claim 5, further comprising a heat sink material in said gap.

8. The sealed prismatic metal hydride battery claimed in claim 2, wherein, heat generated at the surface of said nickel metal hydride particles follows current collectors to a surface of said case.

9. A sealed prismatic metal hydride battery module comprising:
   a plurality of metal hydride cells each comprising a case of metallic thermally conductive material enclosing at least one bundle of thermally conductive sintered metal hydride electrodes in thermal contact with said case; and
   a module case of metallic thermally conductive material enclosing said plurality of metal hydride cells and in thermal contact with at least one case of said plurality of metal hydride cells.

10. The sealed prismatic metal hydride battery module claimed in claim 9, said case is configured to form pressure containing surfaces.

11. The sealed prismatic metal hydride battery module claimed in claim 9, wherein said module case is configured to form pressure containing surfaces.

12. The sealed prismatic metal hydride battery module claimed in claim 10, wherein said case comprises an inner wall and an outer wall, where said inner wall is bowed toward the interior of said case and tensioned against said outer wall.

13. The sealed prismatic metal hydride battery module claimed in claim 12, wherein said inner wall and said outer wall are positioned to define a gap.

14. The sealed prismatic metal hydride battery module claimed in claim 13, further comprising a coolant in said gap.

15. The sealed prismatic metal hydride battery module claimed in claim 14, further comprising a heat sink material in said gap.

16. A battery module for heat dissipation and pressure containment comprising:
   a plurality of cells each comprising a case of metallic thermally conductive material enclosing at least one bundle of thermally conductive sintered metal hydride electrodes and current connectors in thermal contact with said bundle of electrodes;
   a top frame positioned around the periphery of said plurality of cells;
   a bottom frame positioned opposite said top frame and around the opposite periphery of said plurality of cells;
   a first finned plate positioned perpendicular to said top frame and said bottom frame and connecting said top and bottom frames;
   a second finned plate positioned perpendicular to said top frame and said bottom frame, connecting said top and bottom frames, and opposing said first finned plate; and
   at least two opposing restraining means perpendicular to and connecting said first and said second finned plate;
   where heat generated inside said cell follows said metal hydride electrodes to said current connector to said case, said top frame, said bottom frame, said first finned plate, said second finned plate, and said at least two opposing restraining means.

17. The battery module claimed in claim 16, wherein:
   said at least two opposing restraining means are machined to interlock with said first finned plated and said second finned plate.

18. The battery module claimed in claim 17, wherein:
   said at least two opposing restraining means are finned.

19. The battery module claimed in claim 16, wherein:
   said first finned plate and said second tinned plate have spacedly disposed fins.

20. The battery module claimed in claim 16, wherein:
   said first finned plate and said second finned plate have spacedly disposed fins of incrementally increasing size toward the mid line of said first finned plate and said second finned plate such that the apex of said fins forms a convex surface.

21. The battery module claimed in claim 16, further comprising:
   thermal conduction plates positioned to prevent said plurality of cells from contacting each other.

22. The battery module claimed in claim 21, wherein said thermal conduction plates are a honeycombed material having air passages therethrough.

23. A battery module for heat dissipation and pressure containment comprising:
   a plurality of cells; each comprising a case of metallic thermally conductive material enclosing at least one bundle of thermally conductive sintered metal hydride electrodes and current connectors in thermal contact with said bundle of electrodes:
   a plurality of thermal conduction plates positioned to prevent adjacent cells of said plurality of cells from contacting each other;

opposing end panels positioned parallel to said plurality of thermal conduction plates at the outermost cells of said plurality of cells; and restraining means positioned around said plurality of cells, said plurality of thermal conduction plates, and said opposing end panels to form a pressure containment system where heat generated inside said cell follows said metal hydride electrodes to said current connector to said case, said plurality of thermal conduction plates, said opposing end panels, and said opposing restraining means.

24. The battery module claimed in claim 23, wherein said opposing end panels are thermal conduction plates.

25. The case claimed in claim 24, wherein said thermal conduction plates are a honeycombed material having air passages therethrough.

26. The battery module claimed in claim 24, wherein said restraining means are machined to interlock with said thermal conduction plates.

27. The battery module claimed in claim 24, wherein said restraining means are finned.

28. The battery module claimed in claim 27, wherein said fins are spacedly disposed.

29. The case claimed in claim 28, wherein said opposing end panels have spacedly disposed fins of incrementally increasing size toward the mid line such that the apex of said fins forms a convex surface.

30. A prismatic battery module for heat dissipation and pressure containment comprising:

a plurality of prismatic metal hydride cells in individual cases, each cell comprising thermally conductive sintered electrodes and current connectors in thermal contact with said thermally conductive sintered electrodes in a case of metallic thermally conductive material;

opposing end panels positioned parallel to the longitudinal axis of said plurality of cells in thermal contact with said plurality of prismatic metal hydride cells; and restraining means positioned on the widest axis of said plurality of prismatic metal hydride cells to prevent deformation of said individual cases, where said restraining means and said opposing end panels form a pressure containment system; and where heat generated inside said cell follows said thermally conductive electrodes to said current connectors to said case, said opposing end panels, and said restraining means.

31. The prismatic battery module claimed in claim 30, wherein said opposing end panels are thermal conduction plates.

32. The prismatic battery module claimed in claim 31, wherein said thermal conduction plates are a honeycombed material having air passages therethrough.

33. The prismatic battery module claimed in claim 30, wherein said restraining means are machined to interlock with said thermal conduction plates.

34. The prismatic battery module claimed in claim 30, wherein said restraining means are finned.

35. The prismatic battery module claimed in claim 34, wherein said fins are spacedly disposed.

36. The prismatic battery module claimed in claim 30, wherein said opposing end panels have spacedly disposed fins of incrementally increasing size toward the mid line such that the apex of said fins forms a convex surface.

\* \* \* \* \*